Patented Mar. 9, 1937

2,073,052

UNITED STATES PATENT OFFICE 2,073,052

MANUFACTURE OF CELLULOSE DERIVATIVES AND IN PLASTIC PRODUCTS, ETC.

Henry Dreyfus, London, England

No Drawing. Application November 2, 1935, Serial No. 48,045. In Great Britain November 26, 1934

11 Claims. (Cl. 260—101)

This invention relates to the manufacture and application of nitrogen-containing cellulose derivatives.

I have found that nitrogen-containing cellulose derivatives which have an affinity for acid wool colours and for most of the direct cotton colours, may be obtained by reacting cellulose derivatives containing an unsaturated grouping with ammonia either by a direct treatment of the unsaturated cellulose derivative with ammonia, or by first treating the unsaturated cellulose derivative with halogenating agents such as chlorine, bromine or other halogen, sulphuryl chloride, hydrochloric acid or other halogen acid, and then treating the product with ammonia.

When halogenating agents are employed the reaction between the cellulose derivative and ammonia may be carried out in presence of an inorganic or an organic base containing no replaceable hydrogen atom, for example, calcium hydroxide, dimethyl aniline or pyridine. When the cellulose derivative under treatment is a saponifiable cellulose ester, the base employed should only be weak, in order that no saponification or no substantial saponification may take place.

The treatment with ammonia may be carried out at atmospheric pressure and at any suitable temperature, but considerable acceleration of the process, especially when the ammonia is caused to react directly with the unsaturated cellulose derivative, is obtained by working at an increased pressure, for example a pressure of several atmospheres, say 5–10 up to 50 atmospheres or more, and/or at an increased temperature, for example, a temperature of 50- 100° C. or more. The ammonia may be used in the liquid state, for example in aqueous or organic solution, or in the vapour state.

In treating unsaturated cellulose esters with ammonia the conditions are preferably so chosen that saponification of the ester by the ammonia is either avoided altogether or is reduced to a minimum. Any tendency of the ammonia to saponify the esters may be reduced or eliminated in a number of ways. More particularly, where ammonia readily saponifies the ester, it is desirable to work either in the vapour or in the liquid phase under substantially anhydrous conditions. For example, dry ammonia gas or ammonia gas only slightly moist may be used, or ammonia in solution in an anhydrous or substantially anhydrous organic solvent, e. g., methyl or ethyl alcohol, cyclohexanol, or ether, may be employed. Unsaturated cellulose ethers as starting materials give rise to no difficulties on the score of saponification, and hence precautions to avoid such action are unnecessary. The reaction may be effected by treating the cellulose derivative with ammonia in a closed vessel, or ammonia, either alone or mixed with a suitable diluent, may be continuously circulated through the cellulose derivative.

The process of the invention may be applied to the treatment of unsaturated cellulose esters or ethers of any series. For example, the cellulose ethers may be simple unsaturated aliphatic ethers of cellulose as, for example, allyl cellulose, vinyl cellulose or crotonyl cellulose, or of the cyclic series, for instance styryl cellulose. The esters may be of the aliphatic series, the ester groupings being either unsubstituted or substituted as, for example, by hydroxy groups and/or carboxy groups, for instance cellulose crotonate, cellulose undecylenate, cellulose oleate, cellulose linoleate, cellulose ricinoleate and cellulose maleate. Cellulose esters of acids of the aromatic series or of the alicyclic series may be employed as starting materials, for example cellulose cinnamate. The unsaturated cellulose derivatives may contain in addition to the unsaturated groups saturated groups which may be either ester or ether groups, for example acetyl, formyl, propionyl, butyryl, benzoyl, methyl, ethyl, propyl, benzyl or oxy-alkyl groups. The invention includes quite broadly the treatment of simple or mixed cellulose ethers, simple or mixed cellulose esters and cellulose ether-esters, in which one or more of the ester or ether groups contains an unsaturated grouping.

The initial ester or ether may, if desired, be in fibrous form, for example in the form in which it is obtained by esterification or etherification of cotton or other cellulose yarn or fabric with the appropriate esterifying or etherifying agent without resultant solution of the product. Alternatively, the cellulose derivative may be treated when in solution in a suitable solvent which should also be a solvent for ammonia.

The following examples are given to illustrate the invention:—

Example 1

Allyl cellulose in fibrous form is heated in a saturated aqueous solution of ammonia at a temperature of about 100–110° C. in an autoclave until the cellulose derivative attains the desired nitrogen content. The cellulose derivative is then purified by washing with water or other non-solvent.

Example 2

Cellulose crotonate is suspended in ether containing ammonia in an autoclave and is heated at a temperature of 50–60° C. until the cellulose derivative attains the desired nitrogen content. The ether is then removed and the nitrogen-containing derivative purified by washing with a suitable non-solvent.

Example 3

Allyl cellulose is suspended in carbon tetrachloride in a suitable vessel and a solution of bromine in carbon tetrachloride is introduced, the temperature being maintained at 25–35° C. When no further absorption of bromine takes place, the carbon tetrachloride and excess bromine are removed, preferably under reduced pressure, and the cellulose derivative washed with ligroin. A nitrogen-containing derivative is then obtained by circulating ammonia gas through the cellulose derivative contained in the vessel maintained at a temperature of about 60–80° C. On completion of the reaction the nitrogen-containing cellulose derivative is washed with a suitable non-solvent and dried.

The nitrogen-containing cellulose derivatives produced according to the present invention have an affinity for acid wool colours and for some of the direct cotton colours, and are therefore valuable for use as textile materials. For this purpose they may be used alone, but are of more value when used in conjunction with the known cellulose esters or ethers, for example cellulose acetate, which lack affinity for certain dyestuffs. By incorporating small proportions of the nitrogen-containing cellulose derivatives in yarns and other products having a basis of cellulose acetate or other organic derivative of cellulose the tendency to acid fading of anthraquinone and other dyestuffs used in colouring the products may be reduced, as described in U. S. application S. No. 677,850 filed 27th June, 1933.

Artificial filaments, foils and similar products may be obtained from the cellulose derivatives produced according to the present invention by dry or wet processes, examples of suitable solvents for use in the production of such materials from the cellulose derivatives being acetone, methylene ethylene ether, dioxane, glycol monoacetate, methyl and ethyl glycol monoacetates, diacetone alcohol and ethyl lactate.

The nitrogen-containing cellulose derivatives produced by the treatment with ammonia may, if desired, be alkylated, arylated (including aralkylated) or acylated before being converted to industrial uses. Alkylation tends in general to increase substantially and aralkylation to increase somewhat the affinity of the cellulose derivatives for acid wool colours. Moreover, nitrogen-containing cellulose derivatives produced according to the present invention which contain free hydroxy or carboxy groups may be further treated to etherify or esterify such groups, for example by treatment with acetic anhydride, acetyl chloride, ethyl chloride or dimethyl sulphate.

The nitrogen-containing cellulose derivatives of the present invention may be used for the manufacture of plastic masses, and are particularly useful where colouration with sulphonated or like dyestuffs is required, and for the manufacture of films, moulding powders and the like. For this purpose they may be plasticized by means of any suitable plasticizing agents, e. g. triphenyl-acetin, triphenoxy-acetin, tri-acetin, dimethyl phthalate, diethyl phthalate, triethyl citrate, dibutyl tartrate, p-toluene-sulphonamide and other aryl sulphonamides and sulphonanilides.

The nitrogen-containing cellulose derivatives which are either soluble in water or readily dispersible in water, due for example to the presence therein of free hydroxy, carboxy and/or other hydrophile groups, may be used as sizes in the textile arts. For example, a nitrogen-containing cellulose derivative having an affinity for acid wool colours and being soluble or readily dispersible in water is particularly useful for the sizing of yarns of cellulose acetate or similar organic derivatives of cellulose, its use admitting of the ready application of an acid wool colour as a fugitive colouration for the identification of the yarn.

The expression "unsaturated aliphatic radicle" used in the claims is to be understood to include unsaturated acyclic radicles present in aromatic compounds as e. g. in styryl cellulose and cellulose cinnamate.

What I claim and desire to secure by Letters Patent is:—

1. Process for the manufacture of nitrogen-containing cellulose derivatives, which comprises reacting with ammonia under anhydrous conditions a cellulose ester of an acid containing an unsaturated aliphatic radicle, and effecting such reaction under conditions in which substantially no saponification of the cellulose ester is effected.

2. Process for the manufacture of nitrogen-containing cellulose derivatives, which comprises reacting with ammonia under anhydrous conditions a cellulose derivative which contains an unsaturated aliphatic radicle present in a substituent ether grouping.

3. Process for the manufacture of nitrogen-containing cellulose derivatives, which comprises reacting a cellulose derivative which contains an unsaturated aliphatic radicle with a halogenating agent, and then under anhydrous conditions with ammonia.

4. Process for the manufacture of nitrogen-containing cellulose derivatives, which comprises reacting with ammonia under anhydrous conditions at super-atmospheric temperature a cellulose derivative which contains an unsaturated aliphatic radicle.

5. Process for the manufacture of nitrogen-containing cellulose derivatives, which comprises reacting with ammonia under anhydrous conditions at super-atmospheric pressure a cellulose derivative which contains an unsaturated aliphatic radicle.

6. Process for the manufacture of nitrogen-containing cellulose derivatives, which comprises reacting with ammonia under anhydrous conditions a cellulose derivative which contains an unsaturated aliphatic radicle by continuously circulating ammonia through said cellulose derivative.

7. Process for the manufacture of nitrogen-containing cellulose derivatives, which comprises reacting with ammonia under anhydrous conditions a cellulose derivative which contains an unsaturated aliphatic radicle by continuously circulating ammonia under super-atmospheric pressure through said cellulose derivative.

8. Process for the manufacture of nitrogen-containing cellulose derivatives, which comprises reacting a cellulose derivative which contains an unsaturated aliphatic radicle with a halogenating agent and then under anhydrous conditions with ammonia, the treatment with ammonia being effected by continuously circulating ammonia through the cellulose derivative.

9. Process for the manufacture of nitrogen-containing cellulose derivatives, which comprises reacting with ammonia under anhydrous conditions in an inert medium a cellulose derivative which contains an unsaturated aliphatic radicle.

10. Process for the manufacture of nitrogen-containing cellulose derivatives, which comprises reacting with ammonia under anhydrous conditions a cellulose derivative which contains an unsaturated aliphatic radicle, and subjecting the product to acylation.

11. Process for the manufacture of nitrogen-containing cellulose derivatives, which comprises reacting with ammonia under anhydrous conditions a cellulose derivative which contains an unsaturated aliphatic radicle, and subjecting the product to acetylation.

HENRY DREYFUS.